E. W. WYNNE.
TREATMENT OF PETROLEUM AND LIKE OILS.
APPLICATION FILED AUG. 28, 1918.
1,351,458.
Patented Aug. 31, 1920.
3 SHEETS—SHEET 1.
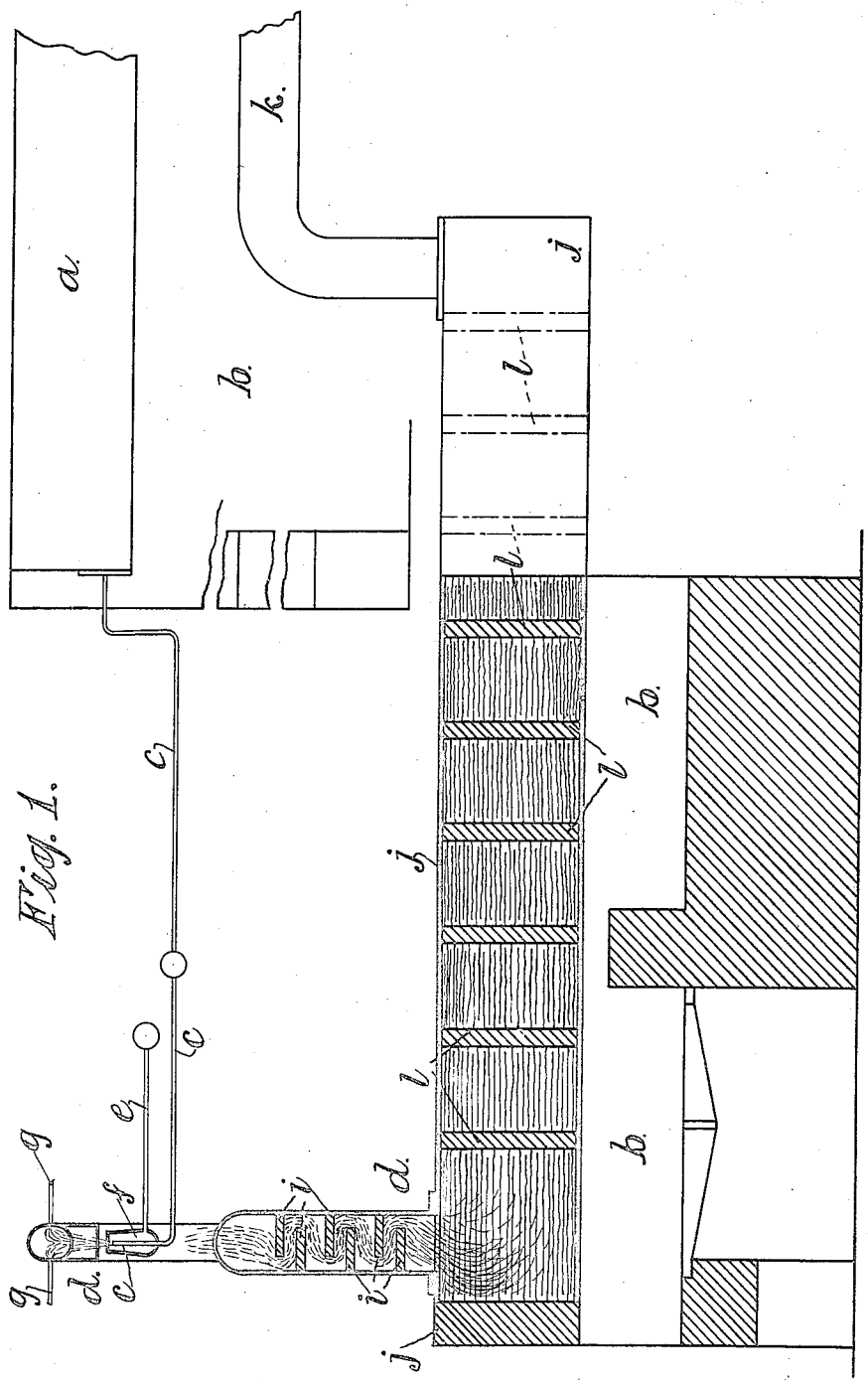

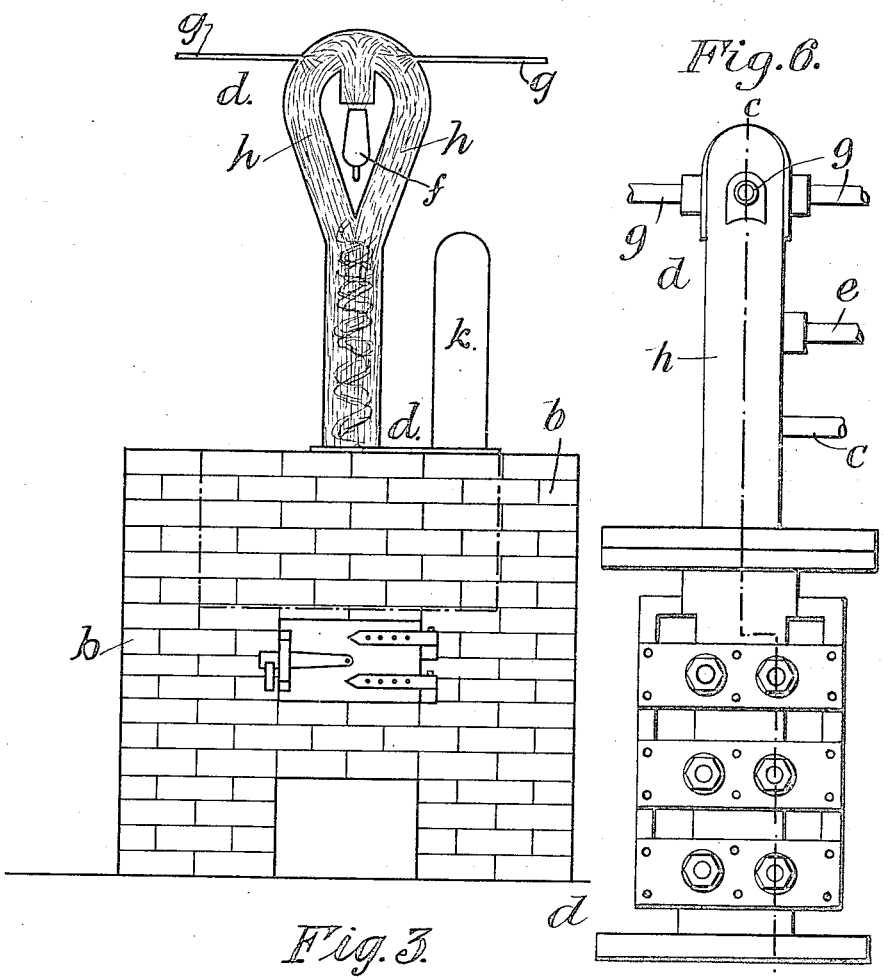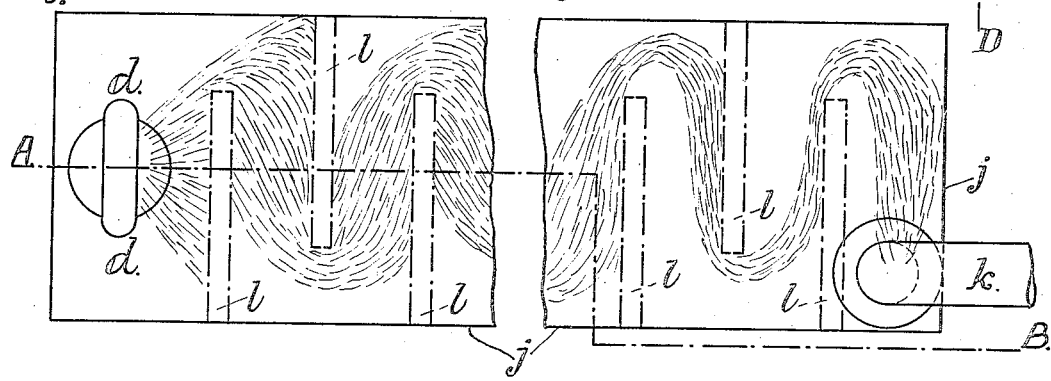

E. W. WYNNE.
TREATMENT OF PETROLEUM AND LIKE OILS.
APPLICATION FILED AUG. 28, 1918.

1,351,458.

Patented Aug. 31, 1920.
3 SHEETS—SHEET 3.

Edward Williams Wynne,
by
Att'ys

UNITED STATES PATENT OFFICE.

EDWARD WILLIAMS WYNNE, OF LIVERPOOL, ENGLAND.

TREATMENT OF PETROLEUM AND LIKE OILS.

1,351,458.  Specification of Letters Patent.  Patented Aug. 31, 1920.

Application filed August 28, 1918. Serial No. 251,716.

*To all whom it may concern:*

Be it known that I, EDWARD WILLIAMS WYNNE, a subject of the King of England, residing at 35 South John street, Liverpool, in the county of Lancaster, England, petroleum-oil expert, have invented certain new and useful Improvements in or Relating to the Treatment of Petroleum and like Oils, of which the following is a specification.

This invention relates to the treatment of petroleum and like oils so that on being distilled they will yield less residue and a more valuable product of distillation than usual, and according to a method of producing an electrical interchange between particles of oil, the particles in atmospheric oxygen, steam or heated compressed air, and ozonized oxygen.

My invention has for its object to provide a new and improved means or apparatus for effecting such treatment of petroleum, said means or apparatus comprising, in combination:—a furnace; a tank wherein crude oil is heated by said furnace; a spraying apparatus communicating with said tank and embodying a chamber with which a steam or heated atmospheric air pipe communicates and is so arranged that the oil is upwardly directed; pipes through which jets of ozonized oxygen passes; down passages in which oil vapor and steam or heated atmospheric air are mingled and impregnated with the ozonized oxygen, electrodes subjecting the mixture to silent electrical discharges in the lower portion of the spraying apparatus with which the down passages communicate, and a still communicating with the spraying apparatus and in which additional electrodes subject the mixture to a further silent electrical discharge.

Considering the drawings:—

Figure 1 is a diagrammatic elevation of the apparatus;

Fig. 2 is a front elevation of the apparatus;

Fig. 3 is a plan of a portion of the same; showing a line A—B on which a portion of Fig. 1 may be considered, and Figs. 4 to 7 inclusive are enlarged detail views of the spraying apparatus.

Figure 4:
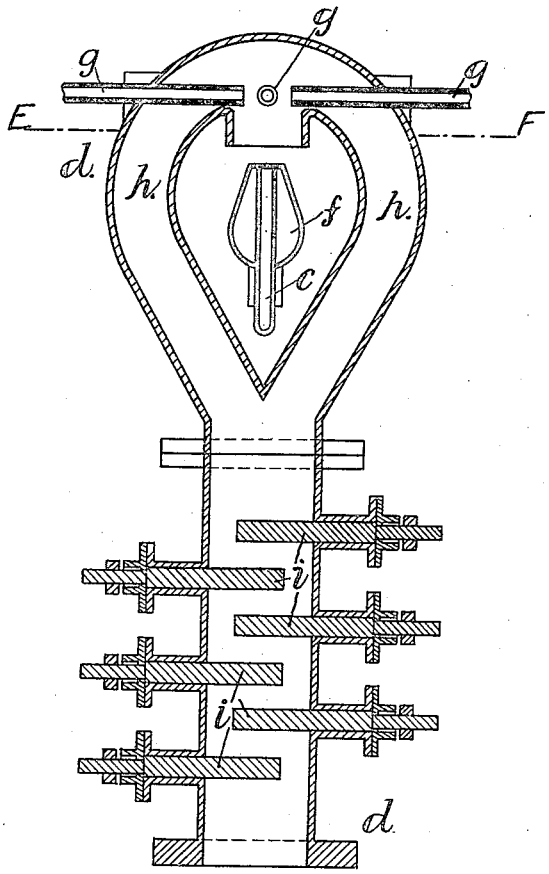
Figure 5:
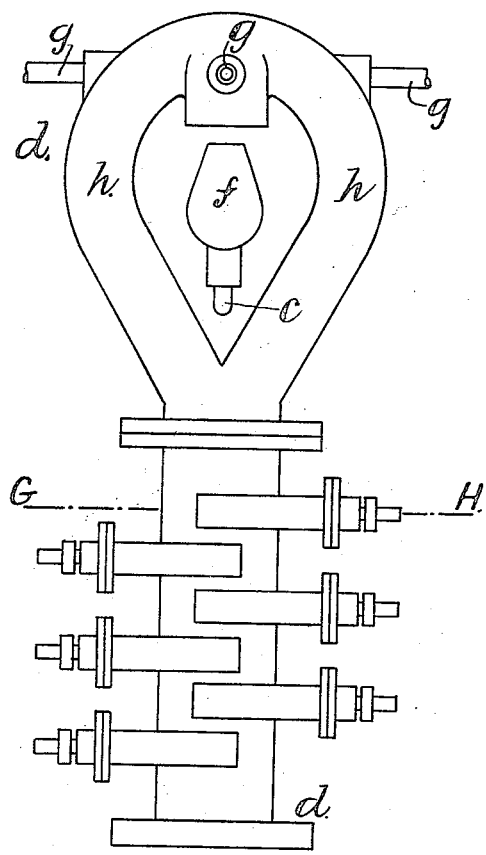
Figure 7:
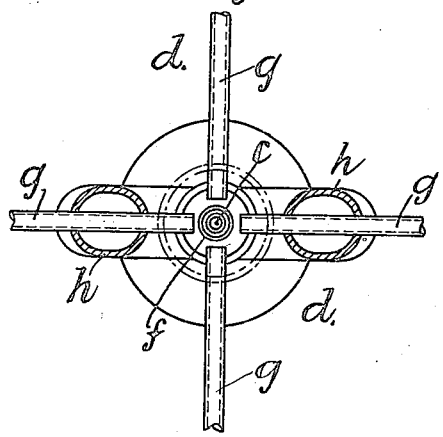

The reference character —a— indicates a crude oil tank wherein the oil to be treated is heated by the furnace —b— to a sufficient degree to render it mobile so as to flow through a pipe —c— to the spraying apparatus, generally designated —d—, where the crude oil is forced in an upward direction in a finely divided spray by the action of steam or heated atmospheric air supplied through a pipe —e— to a chamber —f— of the spraying apparatus.

Impinging against the fine vapor are powerful jets of ozonized oxygen supplied through pipes —g—, and this combination of fine clouded oil vapor and steam, or heated atmospheric air mingled with and clearly impregnated with the ozonized oxygen, passes through down passages —h— of the spraying apparatus —d— and encounters suitable electrodes —i—. These electrodes further shatter the molecular particles in the hydro-carbons and purify it on its passage to a still —j—, in which are disposed electrodes —l—, where it undergoes a further electrical treatment before it passes through a pipe —k— to a distilling apparatus for distillation in the usual manner, as practiced in the present day oil refineries.

I prefer to use an alternating electric current of high frequency of one hundred and eight periods per second and three thousand volts or upward, and endeavor to pass as large a volume of ozonized oxygen as possible through the oil, when in a finely vaporized condition, before it passes through the spraying apparatus into the still proper.

I found after three hours refining of American petroleum that the flash point of the products had increased twenty-five per cent. over the ordinary methods of refinement while the residue left over in the still, after refinement, had been decreased by approximately twenty five per cent.

What I claim is:—

1. An apparatus for the treatment of petroleum and like oils, comprising a furnace, a tank adapted to receive crude oil and in which the crude oil is heated by said furnace, a spraying device communicating with said tank and embodying a chamber, a steam or heated atmospheric air pipe communicating with the chamber of said apparatus, and adapted to cause the oil to be upwardly directed in said chamber, pipes communicating with the spraying apparatus and through which jets of ozonized oxygen impinge against the oil, said spraying apparatus having down passages in which the oil vapor and steam or heated atmospheric air are mingled and impregnated with the ozonized oxygen, electrodes in the down passages of said spraying apparatus so that the mixture will be subjected to silent electrical discharges, a still, and electrodes in said still so that the mixture is subjected to a further silent electrical discharge.

2. An apparatus for the treatment of petroleum and like oils comprising a tank adapted to have crude oil heated therein, a spraying apparatus communicating with said tank, means communicating with the spraying apparatus to cause crude oil to be sprayed therein, means communicating with the spraying apparatus to subject the sprayed oil therein to ozonized oxygen, a still adapted to receive the charged vaporized oil from the spraying apparatus, and means associated with said still and the spraying apparatus to subject the mixture received by said still to an electrical treatment.

3. An apparatus for the treatment of petroleum and like oils comprising a spraying apparatus adapted to receive oils, means communicating with said spraying apparatus to cause ozonized oxygen to commingle with oil sprayed in said apparatus, electrodes in said spraying apparatus to subject the mixture emitted thereby to an electrical treatment, a still communicating with said spraying apparatus, and electrodes located in said still to subject the mixture to a further electrical treatment.

In testimony whereof I affix my signature in the presence of two witnesses.

EDWARD WILLIAMS WYNNE.

Witnesses:
JOHN HINDLEY WALKER,
EMILY BURNETT.